United States Patent [19]
Smith

[11] 3,760,772
[45] Sept. 25, 1973

[54] LIVESTOCK TREATER
[76] Inventor: Wayne H. Smith, Leoti, Kans. 67861
[22] Filed: June 5, 1972
[21] Appl. No.: 259,474

Related U.S. Application Data
[63] Continuation-in-part of Ser. No. 68,149, Aug. 31, 1970, Pat. No. 3,669,078.

[52] U.S. Cl. ............................................. 119/157
[51] Int. Cl. ................................................ A01k 29/00
[58] Field of Search ..................................... 119/157

[56] References Cited
UNITED STATES PATENTS

| | | | |
|---|---|---|---|
| 1,291,367 | 1/1919 | Barhite | 119/157 |
| 1,050,712 | 1/1913 | Applegate | 119/157 |
| 1,818,419 | 8/1931 | Miller | 119/157 |
| 3,038,445 | 6/1962 | Fleming | 119/157 |

*Primary Examiner*—Hugh R. Chamblee
*Attorney*—John H. Widdowson

[57] ABSTRACT

A livestock treater has a frame with a plurality of legs, one of which is a turnable rubbing device. The frame has a reservoir mounted on the upper portion thereof with the rubbing device extending thereinto and therefrom. A dipper on the upper portion of the rubbing device is adapted to turn therewith and disperse liquid to the rubbing device and to the rubbing device bearing mount. More particularly, the invention is a cattle treater having a rotatable rubbing device integral with the supporting frame for a reservoir and having a dipper operable to remove liquid from the reservoir and transfer it to the rubbing device and to the rubbing device mounts for lubrication.

6 Claims, 5 Drawing Figures

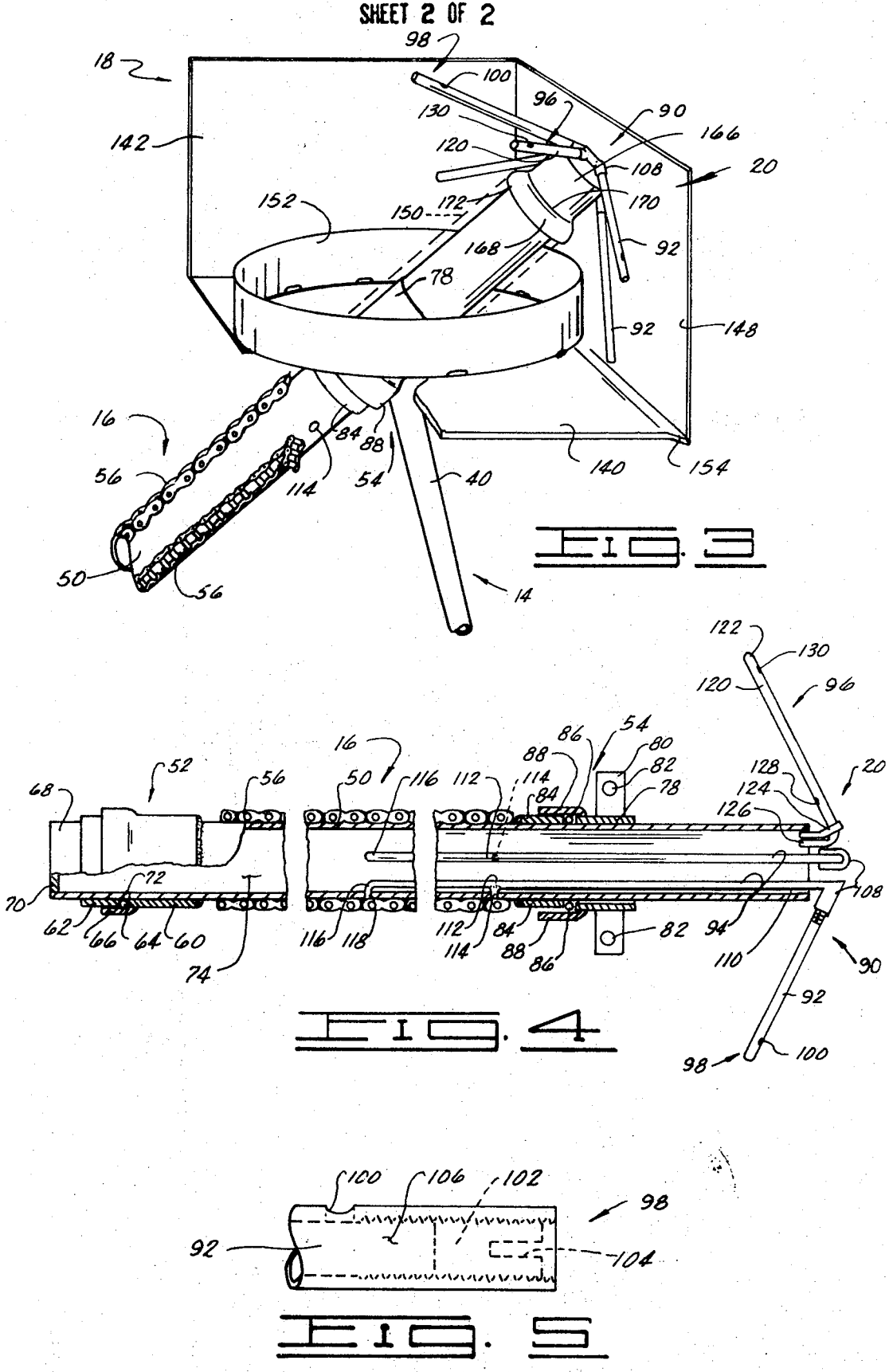

LIVESTOCK TREATER

This application for patent is a continuation-in-part of the application entitled LIVESTOCK TREATER, filed Aug. 31, 1970, having Ser. No. 068,149, now allowed and to be issued June 13, 1972, and to have U.S. Pat. No. 3,669,078.

In the prior art numerous types of livestock treaters are known as operable to dispense oil and other liquids onto cattle and the like in addition to smaller livestock by means of a rubbing device. In the prior art many livestock treaters or rubbing devices have complicated and intricate pumps actuated by motion of the animal against the rubbing portion of the device. These pumping devices use lift pumps and piston pumps operated by linkages and including cables, cams, etc., to dispense liquid from a reservoir of the device onto some rubbing portion of the device. The structure of these prior art livestock treaters includes wheel-like dippers or pumps or other means to remove the liquid from a reservoir and pass it through valves, conduits, and other plumbing type fixtures to the rubbing portion of the device. In each of the prior art devices, a substantial amount of moving parts are involved in operation of the device; these moving parts are subject to maintenance requirements and replacement as necessary and are subject to damage due to rough treatment of the livestock treater by the animals in addition to normal wear and tear. Moreover, in each of the prior art devices which has a generally complicated structure and a substantial amount of plumbing fixtures, they are subject to freezing and clogging during periods of cold weather and thereby rendered non-operational and useless. During normal operation of prior art devices, some of them may be rendered inoperable due to the normal rubbing motion of an animal which rocks the structure and may prevent the fluid removing device from operating properly in taking fluid from the reservoir to be dispensed.

In the herein described preferred specific embodiments of this invention, the livestock treater of this invention includes a frame having a plurality of legs with the reservoir supported on the upper portion thereof. One of the legs of the frame is the rubbing device which is rotatably mounted with the frame and extends into the reservoir on the upper portion thereof. The rubbing device has a dipper on the upper end portion thereof contained within the reservoir adapted to in operation remove liquid from the reservoir and pass it onto the outer surface of the rubbing device for contact by the animals and also pass it onto the rotatable mounts of the rubbing device for lubrication thereof. The reservoir is constructed so as to dampen the sloshing action of liquid contained therein as animals rub against the rubbing device and inherently move and jiggle the livestock treater.

One object of this invention is to provide a livestock treater overcoming the aforementioned disadvantages of the prior art devices.

Still, another object of this invention is to provide a livestock treater having a frame structure having a liquid reservoir mounted thereon, the frame having one leg thereof constructed as a rotatable rubbing device adapted to transfer the liquid to animals as they rub against it and thereby turn it.

Still, another object of this invention is to provide a livestock treater having a dipper device attached to turn with the rubbing device that is adapted to remove liquid from the reservoir and dispense it to the exterior of the rubbing device for transfer to animals, and also to remove liquid from the reservoir and transfer it to the rotatable mounts of the rubbing device for lubrication.

Yet, another object of this invention is to provide a livestock treater having a dipper which operates to dispense liquid from a reservoir and at the same time agitate the liquid in the reservoir.

Yet, another object of this invention is to provide a livestock treater having a reservoir constructed so as to dampen the oscillating motion of liquid contained therein as the livestock treater is rubbed against, moved, and jiggled by animals as they contact the rubbing device portion of the structure.

Still, another object of this invention is to provide a livestock treater having a rubbing device which is turnably mounted with the frame structure of the livestock treater as an integral and structural portion thereof.

Still, an additional object of this invention is to provide a livestock treater that is attractive in appearance, durable in construction, simple in operation, has only one major moving part, and is constructed so that it cannot be easily moved about or overturned by animals while rubbing against it.

Various other objects, advantages, and features of the invention will become apparent to those skilled in the art from the following discussion, taken in conjunction with the accompanying drawings, in which:

FIG. 3 is a perspective view of the upper portion of the livestock treater having major portions of the reservoir removed exposing the interior of the reservoir, the rubbing device, and the dipper;

FIG. 4 is a shortened elevation view of the rubbing device and dipper having major portions thereof shown in section and cut away for clarity;

FIG. 5 is an elevation view of the outer end portion of a dipper conduit showing in dashed lines the valve structure therein.

Figure 1:
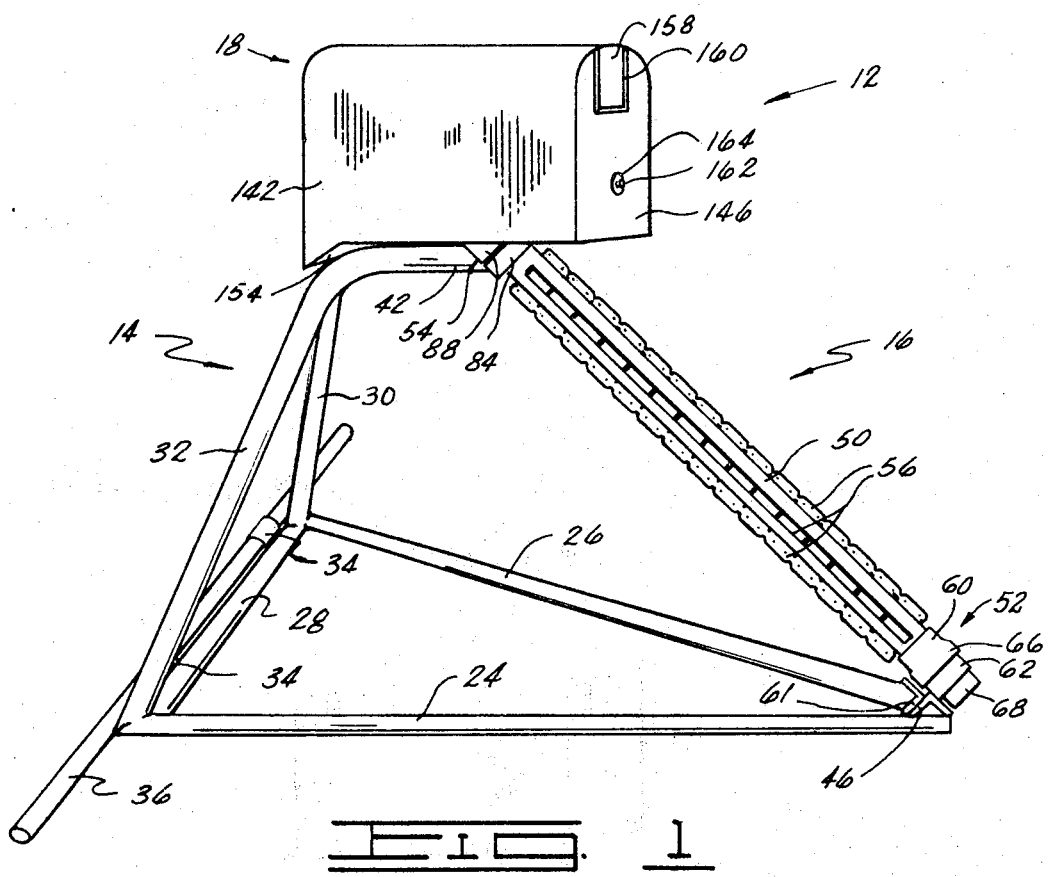
FIG. 1 is a perspective view of the livestock treater taken from above the rubbing end portion with the livestock treater having an extension pipe attached to the ground contact portion of the frame.

The following is a discussion and description of preferred specific embodiments of the livestock treater of this invention, such being made with reference to the drawings, whereupon the same reference numerals are used to indicate the same or similar parts and/or structure. It is to be understood that such discussion and description is not to unduly limit the scope of the invention.

Figure 2:
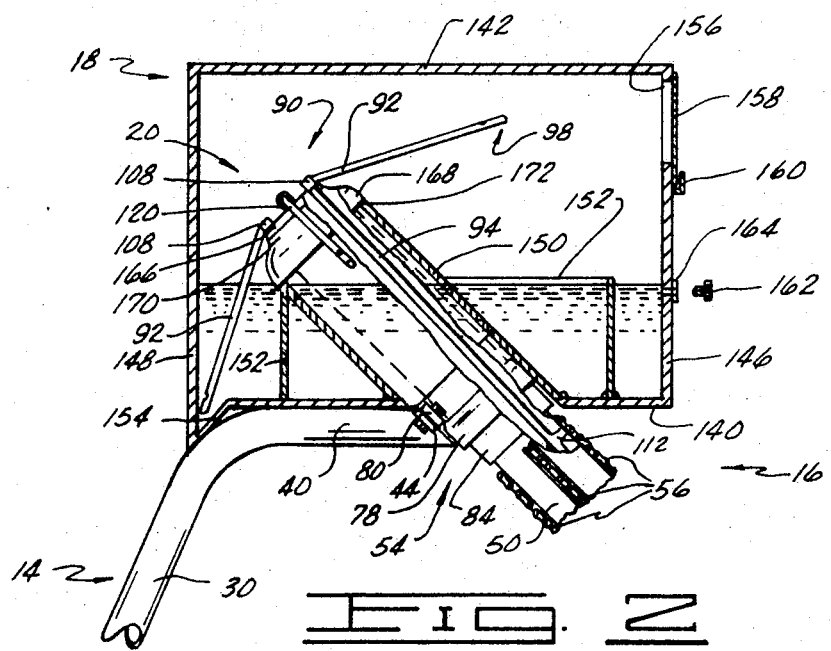
FIG. 2 is a sectional view of the upper portion of the livestock treater with portions of the rubbing device cut away for clarity.

Referring to the drawings in detail and in particular to FIG. 1, the livestock treater of this invention is indicated therein generally at 12. The livestock treater 12 includes a frame structure 14 with a plurality of legs, one of which is the rubbing device 16; the reservoir 18 is supported on the upper portion of the frame structure. FIG. 2 shows the reservoir 18 in section and the dipper 20 on the upper end portion of the rubbing device 16. The dipper 20 removes liquid from the reservoir 18 and disperses it to the rubbing device 16 as the rubbing device 16 is rotated by animals as they scratch themselves against it.

The frame structure 14 is preferably constructed in a general tetrahedral shape as shown in the drawings; it includes a triangular base portion with the legs extending upward therefrom joining at an apex portion. The frame base portion includes two elongated legs 24 and 26 and a shorter leg 28. Two legs of the frame are indicated at 30 and 32 and extend upward from the juncture of the legs 26 and 28 and 24 and 28, respectively. The third leg of the frame is the rubbing device 16; it extends upward from a juncture of the elongated legs 24 and 26. The legs base member 28 has a pair of cylindrical loops 34 attached to its outer portion. The loops 34 are used to support an extension pipe 36 which is used to give the livestock treater structure a more solid stance and prevents tipping as animals move against the rubbing device 16 and shake the structure. The upper portion of the leg 30 and 32 curve to a horizontal portion below what would be the geometric apex of the structure, with the horizontal portions of the legs 30 and 32 indicated at 40 and 42 respectively. The horizontal portions of the legs 40 and 42 join at a transverse mount portion 44 to which the rubbing device 16 is attached. The rubbing device 16 is attached on its upper end to the transverse frame portion 44 and on its lower end to a mount member 46 at the junction of the elongated frame legs 24 and 26.

The rubbing device 16 is shown in detail in FIGS. 2, 3, and 4 and includes an elongated rubbing pipe or rubbing member 50 supported on the frame at a lower mount 52 and at an upper mount 54, with the rubbing pipe 50 having a plurality of scratcher members 56 extending substantially the length thereof, and having the dipper 20 attached to its upper end portion. The rubbing device 16 is constructed so the rubbing pipe 50 will freely turn in the mounts 52 and 54 such as upon contact by an animal or the like. The rubbing pipe 50 is an elongated cylindrical conduit and has the scratcher members 56 attached to its outer surface. The upper mount 54 and lower mount 52 are somewhat similar in construction and are provided with ball bearings to insure free rotation of the rubbing pipe 50. The lower mount 52 has a collar 60 attached to the rubbing pipe 50 and another collar 62 on the outer end portion of the rubbing pipe 50 is spaced a short distance from the collar 60 and adapted to receive ball bearings 64 between the collars. A bearing retaining collar 66 is welded to the collar 60 and extends therefrom over the ball bearings 64 and over a portion of the second collar 62. The collar 60 is rigidly attached to the rubbing pipe 50, preferably by welding same thereto as shown and rotates therewith, whereas the collar 62 is rigidly attached to the frame 14 and retains a stationary position relative to the rotating rubbing device 16. An end portion of the rubbing pipe 50 is indicated at 68 and extends a short distance from the end of the second collar 62. A plug 70 seals the lower end portion 68 of the rubbing pipe 50. An aperture 72 is provided in the wall of the rubbing pipe 50 adjacent to the path of the ball bearings 64 which in operation passes liquid from the interior of the rubbing pipe or the rubbing pipe cavity 74 on into the bearings for lubrication.

The upper mount 54 has a stationary collar 78 by which the turning device 16 is mounted with the frame. A transverse elongated member 80 is rigidly secured to the collar 78 and has apertures 82 in its outer end portions which are used in securing the rubbing device 16 to the transverse frame member 44. The rigid collar 78 fits around the rubbing pipe 50 and is sized slightly larger than the exterior of the rubbing pipe 50 so as not to hinder rotational movement thereof. A second collar 84 is rigidly secured to the rubbing pipe 50, preferably by welding as shown, to rotate therewith, and it is spaced a short distance from the first collar 78 so as to receive ball bearings 86 in the space therebetween. A bearing retainer collar 88 is welded to the rigid collar 78 and extends therefrom over the ball bearings 86 and substantially over the second collar 84 so as to retain the bearings in the proper position and provide protection for them. Lubrication for the mounts 52 and 54 is provided from an arm of the dipper 20 as will be described.

The scratcher members 56 are preferably high-speed roller chains welded to the exterior of the rubbing pipe 50 in straight lines parallel with the pipe's longitudinal axis as shown in the drawings. In practice the use of high-speed roller chains has been found advantageous in use with the livestock treater 12 of this invention. The high-speed roller chains 56 serve well as scratcher members because of their tendency to hold liquid in the roller cases and cavities thereof as well as providing a hard and relatively sharp surface or edge for an animal to scratch its hide. The roller chain 56 is fed liquid by the dipper 20 through apertures in the rubbing pipe 50.

The dipper 20 includes a plurality of elongated dipper conduits, generally indicated at 90 and shown in detail in FIG. 4. The dipper conduits 90 include a pick-up conduit portion 92 and a dispensing conduit portion 94, the pick-up conduit 92 being adapted to pick up and receive liquid from the reservoir 18 and transfer it through its interior passageway to the dispensing conduit 94 whereupon it is transferred to the scratcher members or roller chains 56. The dipper 20 additionally includes a fifth dipper generally indicated at 96 which operates separately from the others in being adapted to pick up liquid from the reservoir and transfer it so as to provide lubrication for the rubbing pipe mounts 52 and 54. The pick-up conduit 92 is an elongated conduit which is adapted to pick up liquid from the reservoir 18 as the rubbing device 16 rotates; it has a valve in its outer end portion to regulate the amount of liquid picked up on each pass through the liquid. FIG. 5 shows in detail the dipper valve, which is generally indicated at 98. The dipper valve includes an aperture 100 in the dipper conduit 92, and a plug 102 in the outer end portion of the dipper conduit. The plug 102 and the outer end portion of the dipper conduit 92 are preferably threaded so as to provide adjustment of the valve. The plug 102 is provided with a slot 104 in its outer end so that it may be screwed through the threaded portion of the dipper conduit 92 thereby adjusting the volume of liquid picked up by the dipper conduit. In operation when the dipper conduit 92 passes into the liquid, the liquid moves into the conduit through the aperture 100 and fills the cavity indicated at 106 between the aperture 100 and the inner end of the plug 102. In operation when the dipper conduit 92 is rotated to a raised position, the entrapped liquid in the valve 98 runs through the conduit passageway into the other conduit 94 and on to the scratcher members 56.

The dipper 20 supports the pick-up conduits 92 on the rubbing pipe 50 by means of an angular head 108 on the upper end of each of the dispersing conduits 94. The head 104 is preferably threaded on its interior to attach a threaded end portion of the pick-up conduits 92. The dispersing conduits are preferably integrally attached to the heads 108. The dispersing conduits 94 on the upper end portion are attached to the end of the rubbing pipe 50 by a spacer block 110 so they are maintained in a relatively parallel relation to the rubbing pipe wall. The lower end portions of the dispersing conduits 94 have a T section indicated at 112 connecting the conduit with an aperture 114 in the rubbing pipe wall to communicate the liquid to the scratcher members 56; the conduits 94 have an elbow on the lowermost end indicated at 116 communicating to an aperture 118 in the rubbing pipe wall to transfer liquid to the scratcher members 56. The T section 112 and the elbow 116 of the dispersing conduits 94 are preferably spaced a significant distance apart; in practice 18 inches spacing has been found to be adequately operable. The apertures 114 and 118 in the rubbing pipe 50 are connected directly below the links of the roller chain scratcher members 56 as shown in FIG. 3 wherein the upper portion of one line of chain links is turned back exposing the upper aperture 114. As liquid passes through the dispersing conduits 94, a portion of it will pass through the T section and through the aperture 114 while the remaining portion will pass through the elbow section 116 and the aperture 118.

The lubricating dipper or fifth dipper 96 is attached to the rubbing pipe 50 and operates separate from the other dipper conduits but in the same general manner. The lubricating dipper 96 includes an elongated dipper conduit 120 with a valved outer end portion 122, a mount 124, an open end portion 126, and an aperture 128 adjacent the exterior of the rubbing pipe 50. The mount 124 secures the conduit 120 to the rubbing pipe 50 in the position shown in FIG. 4. The inner end of the conduit 120 is the open end 126 and is turned into the passageway of the rubbing pipe 50. The aperture 128 in the conduit 120 is positioned adjacent to the exterior of the rubbing pipe 50 and offset from the plane of the conduit 120 and the rubbing pipe 50 so that rotation of the dipper 20 in one direction will cause liquid to pass through the aperture 128 while rotation in the opposite direction will prevent liquid from passing through the aperture 128 and cause it to pass through the open end 126.

The lubricating dipper conduit 120 is preferably approximately the same size, the same length, and in the same relative position as the other pick-up conduits 92 as can be seen in the drawings. The valved end portion 122 of the lubricating conduit 120 is provided with an aperture 130 therethrough adapted to receive liquid into the conduit. Preferably, the valved end portion 122 is a permanently plugged end portion having a small reservoir beyond the aperture 130; however, such can be constructed in the same manner as the dipper valve 98 which is shown in FIG. 5 if desired. In practice it has been found that only a small amount of liquid is required to lubricate the bearings of the lower and upper mounts 52 and 54 as compared to the amount of liquid that is needed to be dispersed to the roller chains 56. When the lubricating dipper 98 is passed into the liquid of the reservoir, a small amount of the liquid is received in the valved end portion 122 of the conduit. As the dipper is raised, liquid passes down the conduit passageway; and depending upon the direction in which the rubbing device 16 is rotated, the liquid will pass either from the aperture 128 or from the conduit open end 126. In the event the liquid passes from the aperture 128, it will run onto the outer surface of the rubbing pipe 50 and down it between the collar 78 and the rubbing pipe 50 into the bearing race to lubricate the ball bearings 86. Excess liquid not needed for lubrication of the upper mount 54 will pass through the space between the retaining collar 88 and the fixed collar 84 and further down the rubbing pipe 50 to the roller chain scratchers 56. In the event the liquid passes from the conduit's opened end 126, it will flow on the interior of the rubbing pipe 50 to the rubbing pipe's lower end portion 68 and pass through the apertures 72 to lubricate the ball bearings 64. When a quantity of liquid will accumulate in the rubbing pipe's lower end portion 68 above the end plug 70, it will flow through the aperture 72 to lubricate the ball bearings 64. Excess liquid from the lubrication will pass between the retainer collar 66 and the fixed collar 62. It is to be noted that due to the construction of the bearing mounts 52 and 54, excess liquid passing from them will in addition to lubricating the ball bearings thereof clean the bearings and the bearing race in a flushing action as it moves through the space between the retaining ring and the adjacent fixed ring on the rubbing pipe 50.

The reservoir 18 is secured to the upper portion of the frame 14 supported on the horizontal portions 40 and 42 of the legs 30 and 32. It is a covered container with a filler opening and constructed with a trough area for the conduits of the dipper 20 to pass as shown in FIGS. 1, 2, and 3. The reservoir 18 has a bottom 140 with a sidewall 142 extending in an upright fashion on both sides of the bottom 140 and curved over the top thereof, a filler end wall 146 and a dipper end wall 148 connect the sidewall 142 and the bottom 140. The reservoir 18 is preferably constructed in a welded and liquid tight fashion. The interior of the reservoir has a rubbing device receiving pipe 150 extending upward from the bottom 140 in an angular manner as shown in FIG. 2 and FIG. 3 of the drawings; it is adapted to receive the upper end portion of the rubbing device 16. Additionally, the interior of the reservoir 18 has a baffle 152 around the junction area of the pipe 150 and the bottom 140. The baffle 152 is cylindrical and welded to the reservoir bottom 140; in operation it is adapted to lessen the sloshing action of the liquid within the reservoir as the livestock treater is used and shaken by animals. The baffle 152 is preferably constructed of imperforate material and extends upward to a height which will be above the normally full liquid level of the reservoir. In operation liquid is on both sides of the baffle 152 and in fluid communication between the interior and exterior of the baffle plus spaces between the bottom of the baffle and the reservoir bottom 140. The spaces between the baffle 152 and the reservoir bottom are not visible in the drawings due to their small size; the spaces are produced by welding the baffle 152 to the bottom 140 at several points therearound to hold the baffle in place yet not seal it with the bottom. In practice the amount of liquid removed from the reservoir is small in flow rate, thus allowing a sufficient amount of liquid to pass through the spaces from the interior to the exterior of the baffle 152 so it can be removed by the dipper device 20.

The reservoir 18 is constructed so as to receive the dipper conduits in a trough portion which is below the level of the bottom 140. The trough portion of the reservoir is formed by an edge portion of the bottom 140 that is indicated at 154 and extends along the dipper end wall 148 of the reservoir and extends downward angularly from the bottom 140. The trough portion extends between the sidewall 142 on both of its upright portions thereby providing a trough completely across the dipper end portion of the reservoir 18. The filler end wall 146 has a filler opening therein in its upper portion and a fluid level indicator. The fluid level opening consists of an aperture 156 through the end wall 146 and a cover 158 which fits in a channel 160 secured to the end wall 146 around the aperture 156. To fill the reservoir the cover 158 is removed from the channel 160 by raising it vertically then replacing it when liquid has been added to the reservoir. The liquid level indicator consists of a plug 162 engagable in a plug fitting 164 that is mounted through the end wall 146. The height of the liquid level indicator plug 162 above the reservoir bottom 140 is shown in its relative position to the baffle 152, the receiving pipe 150 and the rubbing device 16 in FIG. 2 of the drawings. In operation the plug 162 is removed from its fitting 164 as liquid is added to the reservoir 18. When the liquid has reached the proper level, it will begin to come through the aperture of the fitting 164; at such time the filling should stop and the plug 162 be replaced. The overall purpose of the liquid level indicator is to prevent overfilling of the reservoir 18.

The rubbing device 16 extends upward through its passageway pipe 150 into the reservoir 18 as shown clearly in FIG. 2, with the upper end 166 of the rubbing pipe 50 extending above the upper end of the passageway pipe 150. A flexible connecting cover 168 connects the upper end of the rubbing pipe 166 with the upper end of the passageway pipe 150 and is attached to the rubbing pipe 50. The connector 168 is a sleeve or sock preferably constructed of canvas material or the like and is adapted to slide on the pipe 150 as the rubbing device 16 rotates and to prevent liquid which in operation sloshes about within the confines of the reservoir from passing inside the pipe 150 between it and the rubbing member 50 on its upper end portion. The sleeve 168 has a small end 170 which is secured to the exterior of the rubbing pipe end 166 to rotate therewith and a larger bell-shaped bottom end portion adapted to fit over the pipe 150, cover its end portion and rotate against it as the rubbing device 16 turns.

In the use and operation of the livestock treater 12 of this invention, it is placed in an animal pen or area where they are located; then, when it is filled with liquid, it is ready for use. The livestock treater of this invention is adapted to dispense any liquid which can include oil, insecticides, or other various liquid mixtures devised to be rubbed on the coat of an animal for controlling of pests or administering medication. The livestock treater 12 is constructed so that it can be operated by small animals such as hogs or by larger animals such as horses and cattle, and such that it will be difficult for even the small animals to turn it over while rubbing against it. As the rubbing device is rubbed against by an animal, it turns by virtue of the pivotable mounts 52 and 54 thereby rotating the dipper 20 which is attached to its upper end portion and contained in the reservoir 18. As the dipper rotates, liquid is taken in by the pick-up conduits 92 and by the lubricating conduit 96 while the respective conduits are within the liquid. As the rubbing device further rotates, the dipper conduits are raised from the liquid to an elevated position wherein the liquid runs through the passageways of the conduit toward the rubbing pipe 50. Liquid contained within the dispersing conduits 94 passes through the apertures 114 and 118 in the rubbing pipe and into the roller chain scratcher members 56 whereupon it is transferred to the animal. Liquid picked up by the lubricating dipper 96 passes into and onto the rubbing pipe 50 when the dipper is in the raised position; this liquid then lubricates the bearings of the rotatable mounts 52 and 54. The amount of liquid dispersed by the dipper 20 at any given time is a function of the rate at which an animal rotates the rubbing device 16 and the amount of liquid picked up in the dipper valve 98 on the ends of the pick-up conduits 92. As the amount of rubbing which an animal will do against the rubbing device 16 cannot be regulated and is generally a function of the type of animal with which the livestock treater is being used, the dipper valve 98 is a convenient and adjustable means to regulate the quantity of liquid dispensed by the livestock treater 12 during a given period of time. The rotatable mounts 52 and 54 by virtue of their ball bearing construction provide a relatively freely rotatable rubbing device 16 which enables animals to operate the dipper 20 as they roll the roller chain scratchers 56 from one portion of their body to another.

In the use and operation of the livestock treater of this invention, it is seen that same provides a durable structure due to its rigid construction and a simply operable structure due to its only one major moving part. The livestock treater is constructed and adapted to dispense liquid to the skin or coat of an animal by scratchers on a rotatable rubbing device which by its rotating motion simultaneously picks up liquid from a reservoir and dispenses it to the scratchers. The structure of the livestock treater is provided with bearing mounts for the turnable rubbing device which are lubricated and cleaned by liquid dispensed from the dipping device at the same time it removes liquid from the reservoir to dispense to the scratchers.

In the manufacture of the livestock treater of this invention, it is obvious that the structure can be produced by the same methods of manufacture which are currently used to construct other similar devices. Since the livestock treater of this invention includes only one major moving part, it can be constructed with much less expense and effort than would be required for other devices having numerous moving parts requiring precision manufacturing and assembly.

As will become apparent from the foregoing description of the applicant's livestock treater, relatively inexpensive and simple means have been provided to disperse liquid from a reservoir to the skin or coat of livestock as they rub against the device. The livestock treater is constructed so that an animal rubbing against it can rotate the rubbing device and automatically lubricate the bearings supporting the rubbing device and disperse liquid from the reservoir to the rubbing device for transfer to the animal. The livestock treater structure of this invention is economical to manufacture, simple in operation, has only one major moving part, can be easily refilled with liquid and requires very little maintenance and upkeep.

While the invention has been described in conjunction with preferred specific embodiments thereof, it will be understood that this description is intended to illustrate and not limit the scope of the invention, which is defined by the following claims.

I claim:

1. A livestock treater comprising:
  a. a frame means having a plurality of leg members, one of which is a turnable rubbing means,
  b. bearing means mounted on said frame means, said rubbing means mounted therein,
  c. a reservoir means mounted on an upper portion of said frame means and having an upper end portion of said rubbing means therein above the normal liquid level and with the lower end portion of said rubbing means extending downward therefrom,
  d. a dipper means on said upper portion of said rubbing means in said reservoir means connected to turn with said rubbing means and having a plurality of conduits attached to said upper end portion of said rubbing means and extending therefrom, one of said conduits having two outlets positioned to in operation discharge liquid onto said bearing means, said dipper means constructed and adapted in operation to receive liquid from said reservoir means and disperse same to said rubbing means and said rubbing means mount means, and
  e. said reservoir is a container structure,
in operation said livestock treater adapted to function upon livestock rubbing against said turnable rubbing means to turn same.

2. The livestock treater as described in claim 1, wherein:
  a. said bearing means mounts said upper and said lower end portions of said rubbing means,
  b. said rubbing means has an outer rubbing member with means to receive and disperse liquid,
  c. said bearing means has means to receive and disperse said liquid onto the bearings thereof to in operation provide lubrication therefor, and
  d. said reservoir means has means to dampen oscillations of liquid contained therein.

3. The livestock treater as described in claim 2, wherein:
  a. said means to receive and disperse said liquid on said outer rubbing member is a plurality of scratcher members mounted thereon said rubbing member and substantially extending the length thereof,
  b. said means to disperse liquid on said outer rubbing member has a plurality of said plurality of elongated conduit members having one end portion extending therefrom outward and angularly downward relative said outer rubbing member, and said plurality of elongated conduit members have the other opposite end portion thereof extending into said rubbing member and connected with said exterior thereof in communication with said scratcher members,
  c. said plurality of elongated conduit members each have a valve on the outer end portion thereof, said outer end portion of said conduit members are in operation adapted to pass into the liquid in a lowered position, receive same therethrough said valve and rotate therefrom to an upper position such that liquid will pass by gravity flow through said conduit to said scratcher members, and
  d. said means to receive and disperse liquid onto said bearing means has an elongated conduit of said plurality of said elongated conduits that has one end portion extending therefrom outward and angularly relative said outer rubbing member and having the opposite end portion thereof in open communication with the interior of said rubbing member constructed and adapted to pass liquid into said rubbing member to in operation lubricate said lower bearing means mount and having an aperture therethrough said opposite end portion in open communication with said exterior of said rubbing member constructed and adapted to in operation pass liquid onto the exterior of said rubbing member to lubricate said upper bearing means mount.

4. The livestock treater as described in claim 3, wherein:
  a. said elongated conduits having said opposite end portions extending into said rubbing member are attached to the upper end of said rubbing means,
  b. said rubbing means is mounted on the upper end thereof with said frame means at said bearing means joining said leg members and has said end thereof contained within said reservoir,
  c. said elongated conduit in open communication with said rubbing member is attached to the upper end of said rubbing means, and
  d. said means to dampen liquid oscillations is a baffle means attached therein said reservoir means.

5. The livestock treater as described in claim 3, wherein:
  a. said rubbing means has the upper end thereof contained within said reservoir means,
  b. said rubbing means has said upper bearing means mount adjacent and below said reservoir means,
  c. said rubbing means has said lower bearing means mount secured said frame means, and
  d. said bearing means has roller type bearings.

6. The livestock treater as described in claim 5, wherein:
  a. said rotatable mount means has bearing means therein,
  b. said baffle means is a perforate baffle extending upward from the bottom of said reservoir spaced substantially therearound the juncture of said reservoir bottom and said rubbing means, and
  c. said bearing means has ball bearings.

* * * * *